J. L. MIDDLETON.
Churn.
No. 81,810.
Patented Sept. 1, 1868.
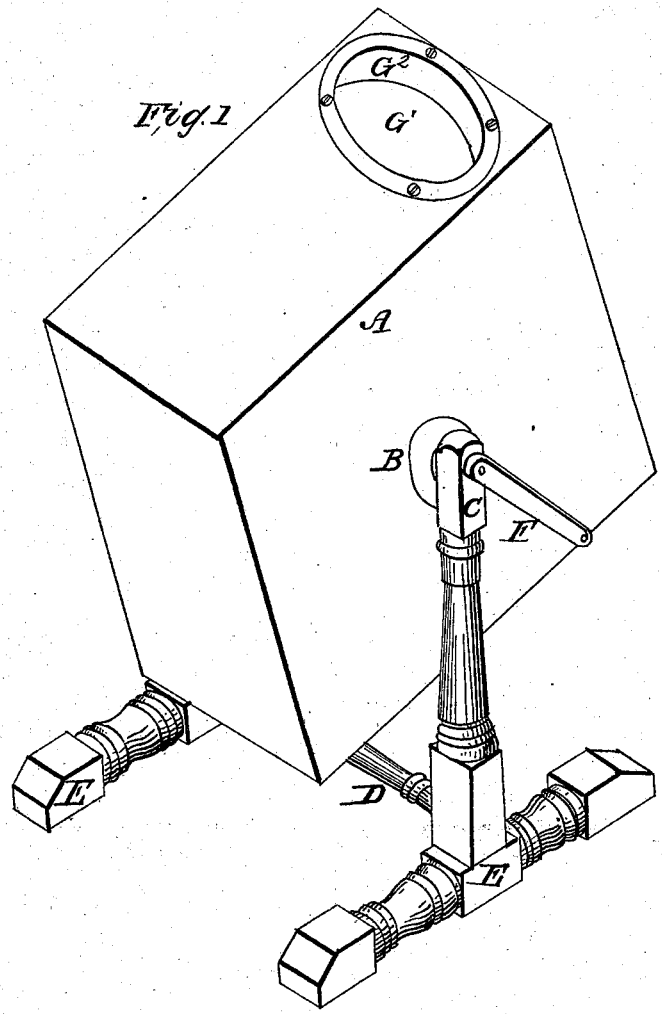
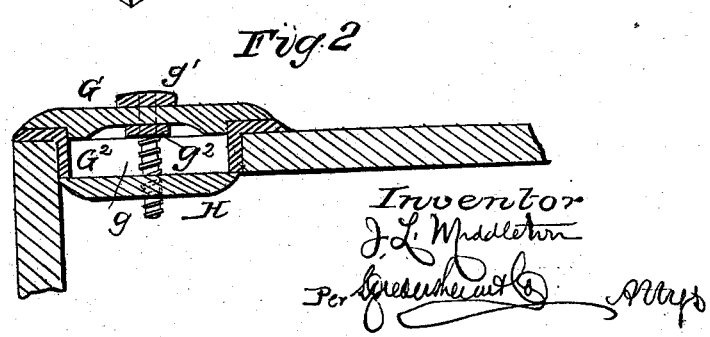

United States Patent Office.

JOHN L. MIDDLETON, OF ZANESVILLE, OHIO.

Letters Patent No. 81,810, dated September 1, 1868.

IMPROVEMENT IN CHURNS.

*The Schedule referred to in these Letters Patent and making part of the same.*

TO ALL WHOM IT MAY CONCERN:

Be it known that I, JOHN L. MIDDLETON, of Zanesville, in the county of Muskingum, and State of Ohio, have invented a new and useful Improvement in Churns; and I do hereby declare the following to be a full, clear, and exact description of the same, reference being had to the accompanying drawings, which are made a part of this specification.

I am aware that butter has been made by placing the cream in a box or rectangular vessel, and turning the latter continuously, the impingement of the cream against the sides of the box, and its agitation within the same, effecting its conversion into butter without the aid of paddles, dashers, or other similar contrivances.

The subject of my invention is a churn, of the kind above referred to, and the improvement consists in a novel device for securing the lid, and admitting of its ready application and removal.

In the drawings—

Figure 1 is a perspective view of a churn illustrating my invention.

Figure 2 is a vertical section, in a plane oblique to the axis, showing the method of applying the lid.

Similar letters of reference indicate corresponding parts in the several figures.

A is a box or rectangular vessel, having trunnions, B B, by which it is mounted to turn in bearings at the upper ends of the uprights C C, or other suitable support.

The uprights are connected at bottom by a bar, D, and rest upon ground-sills, E E, or other base.

A handle, F, or other means of turning the box A, is applied to one of the trunnions, B. These trunnions do not extend within the box A, the interior of which is entirely void or empty, it having no such appliances or projections as are employed in other churns, for the purpose of breaking or agitating the cream.

In this churn, the effective result is due to the agitation produced by the rotation of the box, and to the impingement of the sides against the cream, or *vice versa*, as said sides continually assume each other's position.

Hence, it is obvious that the success of the operation depends upon the quantity of the contained cream relative to the capacity of the box, the impinging-surface, as well as the agitation, being determined accordingly.

Churns of this kind have heretofore been made oblong, for the purpose of obtaining the desired capacity, as well as to secure a free rotary motion; but I attain a far more important object by making the box shallow in the direction of its axis, instead of oblong. Thus, an oblong box containing a given amount of cream, will not present as great an area of surface upon the sides, against which the cream is brought into effective contact, or at the corners, as does the churn-box made in accordance with my invention, that is, shallow or narrow axially.

The opening $G^1$ in the churn, through which the cream is introduced, and the butter removed, I make somewhat oval in form, and provide the same with a lid, G, of corresponding shape. This lid is rebated upon its under side, so as to make a water-tight joint when held firmly in position. It has a central aperture, through which passes a screw, $g$, to the outer end of which is made fast a handle, knob, or button, $g^1$, which always turns with the screw.

The inner end of the screw $g$ engages a female-screw thread in the locking-bar H, which, being held horizontally, and in line with the long diameter of the opening in the churn, may be freely passed through the said opening, which being done, the partial turning of the button $g^1$ serves to turn the locking-bar H into line with the short diameter of the opening, and it being then arrested by a suitable stop, or by coming in contact with the side of the box, the further rotation of the screw $g$ causes its ends to bind against the inside of the box, at the edge of said opening.

By this contrivance, the lid is retained very firmly in position, yet a partial turn of the button and screw will suffice to loosen the lid, and bring the locking-bar into the position in which it may be withdrawn as the lid is removed. The collar $g^2$ prevents the screw from moving longitudinally in the lid. It is manifest that the lid can be removed or applied in an instant.

The opening $G^1$ is provided with a cast-iron rim, $G^2$, which prevents said opening from enlarging or diminishing in consequence of the swelling or contracting of the wood.

Having thus described my invention, what I claim as new, and desire to secure by Letters Patent, is—

The churn A, having an opening, $G^1$, constructed as described, in combination with the metallic lid G, locking-bar H, screw $g$, and handle, knob, or button, $g^1$, substantially as and for the purpose set forth.

To the above, I have signed my name, this 14th day of August, 1868.

JOHN L. MIDDLETON.

Witnesses:
JOHN A. WIEDERSHEIM,
CHAS. D. SMITH.